UNITED STATES PATENT OFFICE.

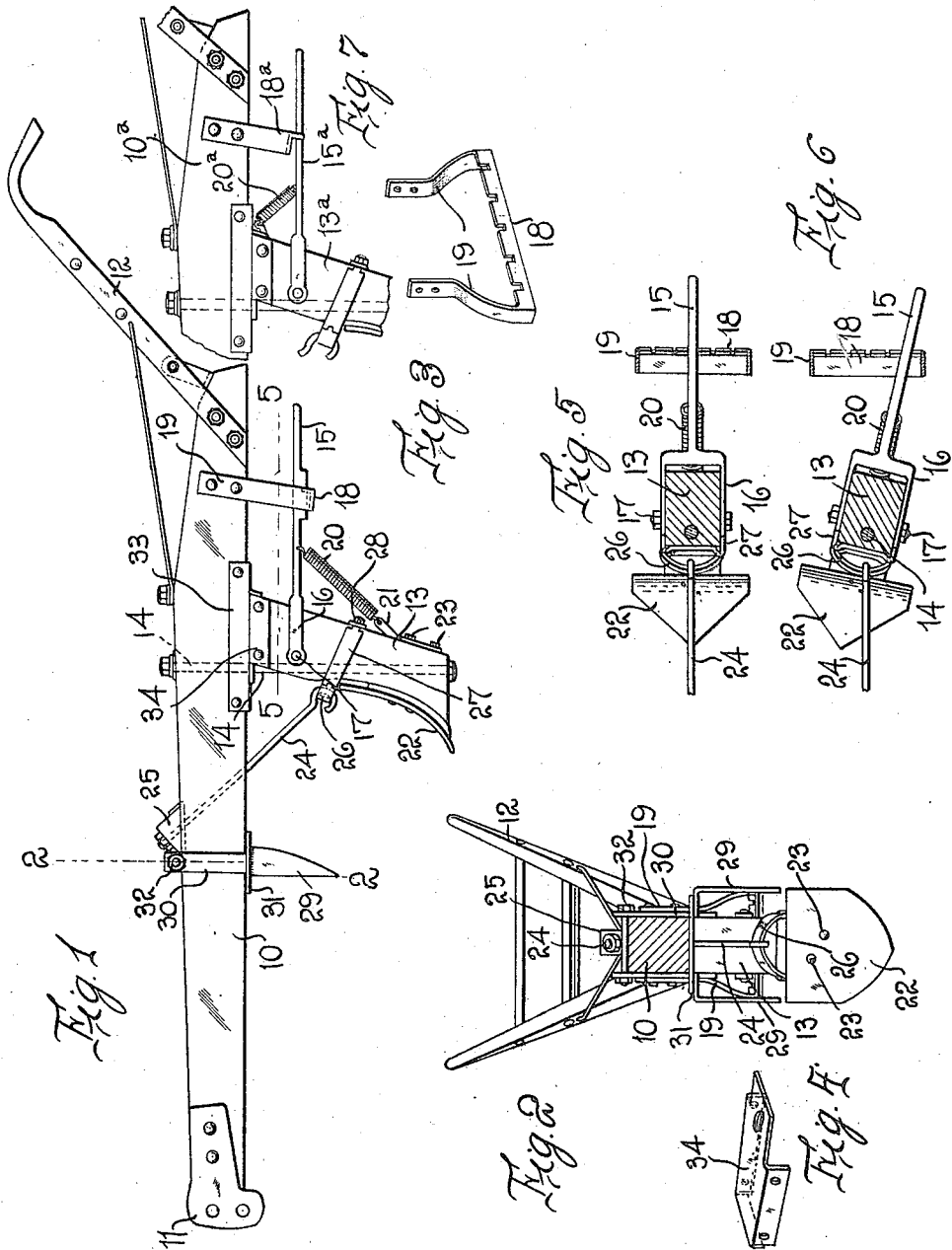

ROBERT F. STUBBLEFIELD, OF ENTERPRISE, OREGON.

SIDEHILL-PLOW.

1,247,739. Specification of Letters Patent. Patented Nov. 27, 1917.

Application filed June 17, 1916. Serial No. 104,264.

*To all whom it may concern:*

Be it known that I, ROBERT F. STUBBLEFIELD, a citizen of the United States, residing at Enterprise, in the county of Wallowa and State of Oregon, have invented a new and useful Improvement in Sidehill-Plows, of which the following is a specification.

This invention relates to plows and its general object is the provision of a plow adapted to be used in plowing land too steep for working with ordinary plows, which plow is so constructed that it is adapted for use on varying slopes and particularly adapted for immediate changes while in operation so that the plow may be changed to suit the immediate slope it is working on.

A further object of the invention is to provide a simply constructed and easily handled side hill plow particularly adapted for turning a furrow one way down a hill, the plow share being adjustable at any time to suit varying slopes of the land along the line of the furrow.

It is a further object of the invention to provide a plow wherein the plow standard which carries the share is rotatably mounted upon the beam so that the plow standard and share may be turned in opposite directions into an angle with the plow beam or so that the share may be turned with its line of operation parallel to the plow beam so as, in the latter case, to divide the plowed ground each way from the center of the furrow, the plow under these circumstances being particularly adapted for use in the construction of water ditches either for irrigating the drainage or the construction of ditches in which pipes are to be placed or for cultivating vegetables, etc.

Another object of the invention is the provision of a device for holding the plow standard and share in their angularly adjusted positions, this device being capable of being operated either by hand or by the foot of the plowman; and another object is to provide for removable and adjustable furrow cutters disposed in advance of the share.

Other objects will appear in the course of the following description.

My invention is illustrated in the accompanying drawings, wherein:

Figure 1 is a side elevation of a plow constructed in accordance with my invention;

Fig. 2 is a section on the line 2—2 of Fig. 1;

Fig. 3 is a perspective view of the notched bar 18;

Fig. 4 is a perspective detailed view of the cap 34;

Fig. 5 is a section on the line 5—5 of Fig. 1, showing the plow adjusted with its share in line with the beam;

Fig. 6 is a like view to Fig. 5 but showing the plow adjusted with its share out of line with the beam; and Fig. 7 is a fragmentary side elevation showing a slightly modified form of the construction.

Referring to these drawings 10 designates the plow beam to the forward end of which is connected the usual clevis 11 and to the rear end of which is attached the usual upwardly extending handles 12 braced from the beam in any suitable manner. Extending downwardly from the under side of the beam is a plow standard 13 which is rotatably connected to the beam by means of a vertical pivot bolt 14 which passes through the beam. This standard 13 is rotatably shifted by means of a handle 15 whose end 16 is bifurcated to a brace or standard and is pivoted thereto by bolts 17. The lever 15 operatively engages with certain notches formed in the upper face of a bar 18 which is supported by means of the legs 19 bolted to the rear end of the plow beam. The lever 15 is urged downward into engagement with the notches by means of the coil spring 20 which, at its lower end is connected to an upwardly extending eye 21. Mounted upon the face of the standard 13 is a plow share 22 having the form of the usual shovel cultivator share, this share being held in place upon the standard in any suitable manner as by the bolts 23. The standard 13 is braced from the beam by means of the upwardly and forwardly extending brace rod 24 which at its upper end has a nut which engages the abutment 25 and which at its lower end is provided with a hook-shaped terminal which engages a transversely elongated eye 26, shown most clearly in Figs. 5 and 6. This eye is operatively connected at its ends to a U-shaped band 27 engaged with a transverse bar 28 bearing against the rear face of the standard.

Disposed in advance of the standard 13 are cutters 29 defining the edges of the furrow. These cutters at their upper ends are inwardly turned as illustrated in Fig. 2 and have upwardly extending shanks 30 which pass through an opening in a plate 31 which plate passes beneath the beam 10. At the upper ends the shanks 30 are connected by means of a transverse bolt 32. It is obvious that the cutters may be shifted longitudinally along the plow beam and thereby adjusted nearer to or farther from the plow share.

The contacting faces of the standard 13 and the plow beam are protected by wear plates 33 and 34, one wear plate 34 having the form of a cap as illustrated in Fig. 4 and being bolted to the upper end of the standard, while the wear plate 43 has the form of a channel iron and is bolted to the beam.

In Fig. 7 I show a slightly modified form of this plow in which the lever 15ª which is connected to the standard 13ª in the same manner as heretofore described is drawn upward by a spring 20ª and engages with the bar 18ª which is notched on its under face. In Fig. 1 the lever 15 may be operated by the plowman lifting up upon the lever and laterally shifting it, while in Fig. 7 the lever 15ª may be operated by the foot of the plowman.

It will be seen that the plow constructed as above described is particularly adapted to working on side hills by reason of the fact that the angle of the share with relation to the plow beam or the line of draft may be readily changed so as to hold the plow to its work, notwithstanding the tendency of the plow to work down hill. This tendency is counteracted by the angular disposition of the share, and this angularity of the share may be changed or adjusted at any time to suit the varying inclinations of the ground. It is plain that on the completion of the furrow and the turning of the plow so as to move in the opposite direction, the lever may be shifted to an opposite position in the notched bar 18 which places the plow in condition for turning the furrow exactly as when moving in the first named direction along the unplowed land. It is obvious also that on level land, the standard may be rotated to shift the angle of the plow share so as to cause the plow to throw the dirt toward one side or the other. By placing the lever in the middle of the notched bar however, the plow may be used for turning the earth both ways from the middle of the furrow, which makes the plow particularly adaptable to the opening of water ditches for drainage or laying down pipes, or for cultivation between the crop rows. It will be further noted that the adjustment of the plow standard may be made at any time while the plow is moving so that the plow is at all times under the control of the operator.

While I have illustrated what I deem to be the most effective form of my improved plow, I do not wish to be limited to all of the details of construction as it is obvious that these may be modified in many ways without departing from the spirit of my invention.

Having described my invention, what I claim is:

1. In a plow, a beam, a plow standard disposed immediately beneath the beam and extending down therefrom, a vertically disposed bolt extending through the beam and standard and supporting the latter for rotation in a horizontal plane, a brace extending downward and rearward from the beam and operatively connected to the standard to permit its rotation to resist rearward movement of the standard, an arm pivotally mounted on the standard and extending rearward therefrom, a notched bar curved upon but disposed below the beam with the notches of which the arm is adapted to engage, and a spring urging the arm into engagement with the notches.

2. In a plow, a beam, a plow standard extending downward from the beam and having its upper end operatively engaged with the beam, the standard being rectangular in cross section, a bolt passing down through the beam and standard and supporting the latter for movement in a horizontal plane, a transversely elongated eye mounted on the standard and having an arcuately curved forward portion, a brace extending downward and rearward from the beam and operatively engaged with said eye, and means for rotatively shifting the standard and holding the standard in its rotatively adjusted positions.

3. In a plow, a beam, a plow standard extending downward from the beam, a bolt passing down through the beam and standard and supporting the standard for movement in a horizontal plane, a transversely elongated eye mounted on the standard and having an arcuately curved forward portion, a brace extending downwardly and rearwardly from the beam and operatively engaged with said eye, an arm having a bifurcated end embracing the standard, and a bolt passing through the bifurcated end of the arm and the standard and pivotally supporting the arm for vertical movement, a notched bar mounted upon the beam and extending below it and with which the arm coacts, and a spring urging the arm into contact with the notched bar.

4. In a plow, a beam, a standard, a plow share mounted thereon, and a pair of cutting blades adjustably mounted on the beam in advance of the standard.

In testimony whereof, I hereunto affix my signature in the presence of two witnesses.

ROBERT F. STUBBLEFIELD.

Witnesses:
LAWRENCE E. O'NEILL,
EUGENE O'NEILL.

Copies of this patent may be obtained for five cents each, by addressing the "Commissioner of Patents, Washington, D. C."